(12) United States Patent
Kasahara et al.

(10) Patent No.: US 8,036,335 B2
(45) Date of Patent: Oct. 11, 2011

(54) THERMAL LOAD REDUCING SYSTEM FOR NUCLEAR REACTOR VESSEL

(75) Inventors: Naoto Kasahara, Ibaraki (JP); Masanori Ando, Ibaraki (JP)

(73) Assignee: Japan Nuclear Cycle Development Institute, Ibaraki (JP)

( * ) Notice: Subject to any disclaimer, the term of this patent is extended or adjusted under 35 U.S.C. 154(b) by 0 days.

(21) Appl. No.: 11/806,723

(22) Filed: Jun. 4, 2007

(65) Prior Publication Data

US 2008/0107226 A1    May 8, 2008

Related U.S. Application Data

(62) Division of application No. 11/785,126, filed on Apr. 16, 2007, now abandoned, which is a division of application No. 10/682,859, filed on Oct. 14, 2003, now abandoned.

(30) Foreign Application Priority Data

Mar. 4, 2003   (JP) .................................. 2003-057147

(51) Int. Cl.
    *G21C 9/00*   (2006.01)
(52) U.S. Cl. ......... 376/283; 376/287; 376/277; 376/289
(58) Field of Classification Search .......... 376/403–406, 376/298, 299, 287, 288, 290
    See application file for complete search history.

(56) References Cited

U.S. PATENT DOCUMENTS

| | | | |
|---|---|---|---|
| 2,831,806 A | | 4/1958 | Wigner |
| 3,080,308 A | | 3/1963 | Dickinson |
| 3,186,913 A | * | 6/1965 | Weisner et al. ............... 376/361 |
| 3,253,966 A | * | 5/1966 | Malagari, Jr. et al. ........ 148/325 |
| 3,306,736 A | * | 2/1967 | Rundell .......................... 420/54 |
| 3,650,709 A | | 3/1972 | Morsing |
| 3,663,215 A | * | 5/1972 | Tanczyn .......................... 420/50 |
| 3,764,835 A | | 10/1973 | Luck et al. |
| 3,769,161 A | | 10/1973 | Costes |
| 3,964,966 A | * | 6/1976 | Lampe .......................... 376/280 |
| 4,116,764 A | * | 9/1978 | Jones ............................ 376/280 |
| 4,162,229 A | | 7/1979 | Loewenschuss |
| 4,172,011 A | | 10/1979 | Seed et al. |
| 4,302,296 A | | 11/1981 | Sharbaugh et al. |

(Continued)

FOREIGN PATENT DOCUMENTS

EP       0 075 683 A1    4/1983

(Continued)

OTHER PUBLICATIONS

Corwin et al. Gen IV Nuclear Energy Systems. http://nuclear.in1.gov/deliverables/docs/intg-matls-plan.pdf cover page and p. 60. downloaded May 18, 2006 .

(Continued)

*Primary Examiner* — Ricardo Palabrica
(74) *Attorney, Agent, or Firm* — Westerman, Hattori, Daniels & Adrian, LLP (57) ABSTRACT

In a reactor vessel thermal load reducing system near the surface level of a coolant, the present invention is characterized in that a heat conductive member is installed not contacting the reactor vessel wall in an area above and below the coolant liquid surface, and the heat conducting member is attached to a guard vessel, the heat conducting member being made of material of good heat conductivity.

2 Claims, 6 Drawing Sheets

U.S. PATENT DOCUMENTS

| | | |
|---|---|---|
| 4,362,694 A | 12/1982 | Kayser |
| 4,696,791 A | 9/1987 | Straub |
| 4,780,270 A * | 10/1988 | Hundal et al. .............. 376/299 |
| 4,818,485 A | 4/1989 | Maziasz et al. |
| 4,859,402 A * | 8/1989 | Tupper et al. ............... 376/285 |
| 4,909,981 A * | 3/1990 | Garabedian ................. 376/293 |
| 4,959,193 A * | 9/1990 | Hunsbedt et al. ............ 376/299 |
| 5,229,067 A * | 7/1993 | Hammers ..................... 376/294 |
| 5,406,602 A | 4/1995 | Hunsbedt et al. |
| 5,583,900 A | 12/1996 | Kasahara et al. |
| 5,699,394 A | 12/1997 | Schreiber et al. |
| 5,774,514 A | 6/1998 | Rubbia |
| 7,676,016 B2 * | 3/2010 | Singh ........................... 376/272 |

FOREIGN PATENT DOCUMENTS

| | | |
|---|---|---|
| JP | 62-218891 | 9/1987 |
| JP | 2-74897 | 3/1990 |

OTHER PUBLICATIONS

Chemical Engineer's handbook, Fifth Edition, 1973, Perry, McGraw-Hill Book Co., pp. (23-38)-(23-39).

* cited by examiner

Without guard vessel (b)

With guard vessel of good heat conductivity

THERMAL LOAD REDUCING SYSTEM FOR NUCLEAR REACTOR VESSEL

This application is a divisional of application Ser. No. 11/785,126, filed Apr. 16, 2007, which is a divisional of application Ser. No. 10/682,859, filed Oct. 14, 2003, which is based upon and claims priority of Japanese Patent Application No. 2003-057147, filed on Apr. 3, 2003, the contents of each of the above being incorporated herein by reference.

BACKGROUND OF THE INVENTION

The present invention relates to a thermal load reducing system for a nuclear reactor vessel, available for the reduction of thermal load near a coolant liquid surface of a reactor vessel and for the reduction of thermal load near a temperature stratified layer in a reactor vessel.

A reactor vessel in a fast breeder reactor is supported at its upper end by a concrete wall, which must be maintained at the temperature of 100° C. or lower. Because it has a high-temperature coolant at 550° C. or higher in a plenum above reactor core, there occurs a steep temperature gradient in the vertical direction from the coolant liquid surface to the upper supported end. In particular, during starting operation, both temperature and liquid level rise at the same time, the gradient becomes steeper. As a result, high thermal stress develops, in principle, on the reactor wall near the liquid surface where the temperature gradient deflects.

To cope with this problem, attempts have been made in the past to prevent the rise of liquid level using a liquid level controller, to evenly cool down the reactor wall using a reactor wall cooling system, and to reduce the bending stress by designing in a thin-wall structure. Also proposed is a reduction method of the temperature gradient near the liquid surface, arranging a liner to form a heat insulated space from reactor vessel wall below the coolant liquid surface to directly below the seal plug, in cooperation with reactor vessel, and by filling heat insulating material into the heat insulated space (Japanese Publication Number JP-A-57-80594).

As described above, the conventional method for reducing thermal load has its principal aims to prevent the rise of liquid level using a liquid level controller, to evenly cool down the reactor wall using a reactor wall cooling system, and to decrease bending stress by designing in a thin-wall structure. The liquid level controller and the reactor wall cooling system result in higher cost because of the increase of system components. For designing the system in a thin-wall structure, there was a limitation due to the possibility of other failure modes. The method described in the patent document referred to above, also leads to higher cost due to the increase of system components.

SUMMARY OF THE INVENTION

The object of the present invention is to provide sure operations and to contribute, without giving a significant impact to the construction cost, both for the increased safety of the reactors and for the improved economy of the plant by reducing the thermal load itself, being the cause to generate stress.

For this sake, in a thermal load reducing system for reduction of stress near a coolant surface of a reactor vessel, the present invention is characterized in that a heat conductive member is installed outside the reactor vessel in the area above and below the coolant liquid surface not contacting to the reactor vessel wall.

Further, the present invention is characterized in that aforementioned heat conductive member is a plate supported by a guard vessel.

Further still, the present invention is characterized in that the aforementioned heat conductive member is of better material in heat conductivity than that of the reactor vessel.

Further still, the present invention is characterized in that the aforementioned good heat conductive material is high chrome steel.

Further still, the present invention is characterized in that the aforementioned good heat conductive material is graphite.

DETAILED DESCRIPTION OF THE PRESENT INVENTION

Explanation will be given below of an embodiment of the present invention, referring to the drawings.

Figure 1:
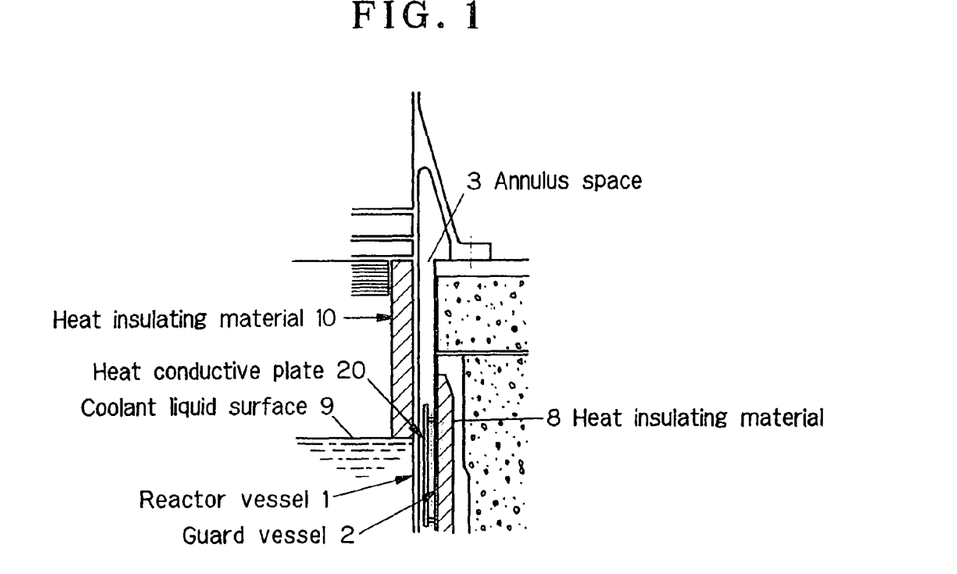
FIG. 1 is a drawing to show an embodiment example of a thermal load reducing system for reduction of stress near the liquid surface of a reactor vessel.

FIG. 1 shows an embodiment example of a thermal load reducing system for reduction of stress near the liquid surface of a reactor vessel.

Outside the wall of the reactor vessel 1, a guard vessel 2 is provided to catch the coolant in the unlikely event of coolant leakage. In an annulus space 3 of about 150 mm width between the reactor vessel wall and the guard vessel, inert gas is filled for the protection of the reactor vessel. On the outer wall of the guard vessel, heat insulating material 8 is provided to keep the concrete temperature not going up. The reactor vessel inner wall above the coolant surface 9, covered with heat insulating material 10, is heat insulated from high temperature of the coolant and this part of the reactor wall is kept at low temperature. Therefore, between high temperature reactor wall below the coolant surface and low temperature reactor wall above the coolant surface, a temperature distribution in the vertical direction takes place, causing a thermal stress.

In the present embodiment, outside the reactor vessel wall and in the region above and below the coolant surface, a heat conductive member, comprised of a good heat conductive material such as graphite etc., stable for a long time, is positioned. In this example, the present embodiment is characterized in that the heat conductive plate 20 as the heat conductive member, is positioned without contact, to expedite the thermal conduction in the vertical direction of the reactor vessel wall and to reduce the thermal stress. The heat conductive plate 20 as shown in the drawing is supported by structures outside reactor vessel such as the guard vessel. For example, the dimensions of the heat conductive plate should approximately be 30 mm in thickness, 1500 mm in length, and positioned at the distance of about 60 mm measured from the reactor vessel wall to the surface of the plate, vertically positioned longer below the liquid level than above the liquid level, for example about 500 mm long above the liquid level and about 1000 mm long below the liquid level.

Figure 2:
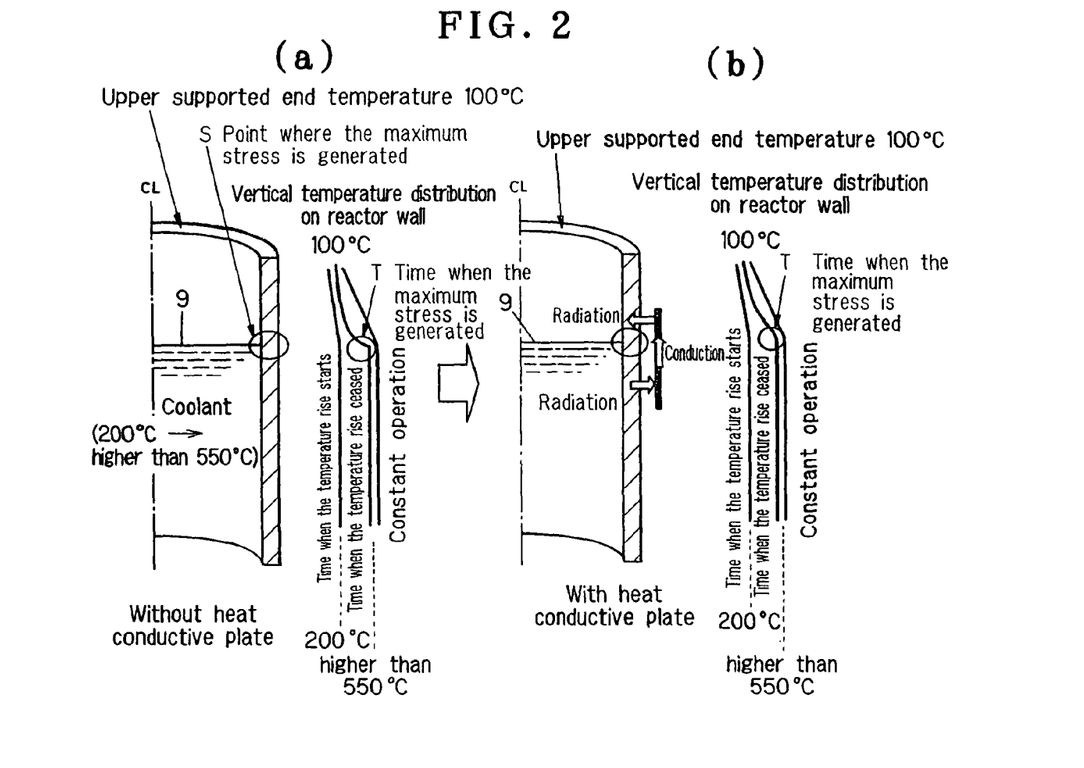
FIG. 2 is a drawing to explain the principle of thermal load reduction near a coolant liquid surface of a reactor vessel.

FIG. 2 is a drawing to explain the principle of thermal load reduction near the coolant liquid surface of the reactor vessel; FIG. 2 (*a*) for the case without the heat conductive plate and FIG. 2 (*b*) for the case with the heat conductive plate. As mentioned previously, the reactor vessel in a fast breeder reactor is supported by concrete structure, the upper end of which must be maintained at the temperature of 100° C. or lower. During the starting operation, the temperature of the contained coolant rises from 200° C. to 550° C. A local temperature gradient in the vertical direction developed during this process, generates a high thermal stress on the reactor wall. Specifically, in case temperature distribution during the starting of the reactor vessel is left freely as it goes (FIG. 2 (*a*)), between the part contacting high temperature coolant and the part contacting low temperature gas, there appears a steep temperature gradient i.e. a bending edge of the temperature curve, at the time when the temperature rise ceased. Accordingly, a maximum stress appears on the outer surface of the reactor wall (the point S in FIG. 2 (*a*)) near the liquid surface at the time when temperature rise ceased. To moderate this problem, as shown in FIG. 2 (*b*), the heat conductive plate is heated up with the heat radiation from the high temperature reactor wall below the liquid level, and in turn, the low temperature reactor wall above the liquid level is heated up with the heat radiation from the heat conductive plate. This makes it possible to reduce the temperature gradient in the vertical direction, which causes the stress. As the result, the temperature gradient at point S where the maximum stress taking place, is smoothed at the time T when the maximum stress being generated, and the thermal load is reduced. This embodiment is characterized not only in low-cost since nothing more than a simple heat conductive plate being added, but also in sure operation since the plate is a non-contacting and static structure.

Figure 3:
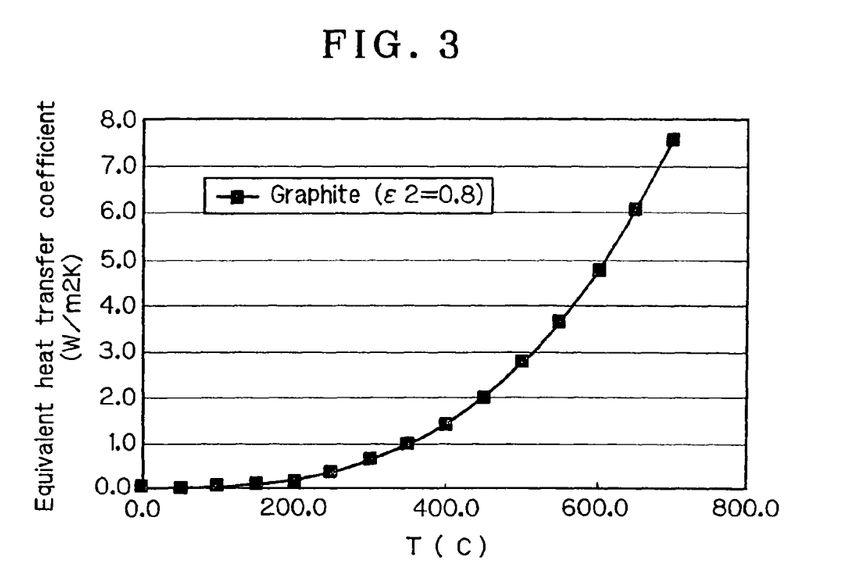
FIG. 3 is a drawing to show the relationship between equivalent heat transfer coefficient due to radiation and temperature in use.

FIG. 3 is a drawing to show the relationship between equivalent heat transfer coefficient due to radiation and temperature in use.

The thermal radiation/conduction quantity between the parallel planes is expressed in the following Formula 1.

$$q = \varepsilon_{eq}\sigma(T_1^4 - T_2^4) = \varepsilon_{eq}\sigma(T_1^3 + T_1^2 T_2 + T_1 T_2^2 + T_2^3)(T_1 - T_2) = h_{eq}(T_1 - T_2)$$

$$\varepsilon_{eq} = \frac{1}{\frac{1}{\varepsilon_1} + \frac{1}{\varepsilon_2} - 1}$$

[Formula 1]

where, $\epsilon_1$ and $\epsilon_2$ is emission rate dependent on materials (quantity ratio in heat received versus heat radiated), between reactor wall made of stainless steal and high chrome steel e.g. 12% Cr steel, a value more than 0.1, in case of graphite a value more than 0.8 and a is Stephan-Boltzmann constant. Supposing the reactor wall of stainless steel and heat conductive plate of graphite, assigning the minimum values of emission rate estimating the effect of heat conductive plate at conservative side, $\epsilon_1$=0.1 and $\epsilon_2$=0.8 into Formula 1, calculating the relation between equivalent heat transfer coefficient heq and T(° C.)=T1=T2 (thermally equal condition), FIG. 3. will be obtained. In FIG. 3, the horizontal axis indicates temperature (T) of the reactor wall or of the heat conductive plate (graphite), and the vertical axis indicates equivalent heat transfer coefficient (heq). As the temperature of the reactor wall and of the heat conductive plate going up, the heat transfer coefficient sharply increases. And at around 600° C., the radiation heating seems to perform a heat transfer close to forced convection gas heat transfer (approx. 5 W/m$^2$ K).

In order to verify the effect of the reduction of thermal load, near the reactor vessel liquid level by means of a heat conductive plate, in both cases of without and with a heat conductive plate, the maximum stresses generated at the start of the reactor operation, were calculated through numerical experiment using finite element method and compared.

Here, cases using graphite or 12% Cr steel for heat conductive material were analyzed. However, since graphite greatly differs in its heat transfer coefficient due to the difference in crystal structures, conservatively lower heat transfer coefficient was used, making the effect of heat conductive plate underestimated. Table 1 shows physical values of reactor wall made of stainless steel.

TABLE 1

| Temperature (° C.) | Coefficient of Young's (N/mm2) | Poisson's Ratio | Transient Thermal Expansion Coefficient (10E−6 mm/mm/° C.) | Density (xE+3 kg/m3) | Heat Transfer Coefficient (xE−6 kcal/mm s ° C.) | Specific Heat (kcal/kg? ° C.) |
|---|---|---|---|---|---|---|
| 20 | 1.54E+05 | 0.3 | 15.15 | 7.97 | 3.5556 | 0.114 |
| 50 | 1.54E+05 | 0.3 | 15.65 | 7.97 | 3.6389 | 0.117 |
| 75 | 1.54E+05 | 0.3 | 16.07 | 7.97 | 3.7500 | 0.118 |
| 100 | 1.54E+05 | 0.3 | 16.48 | 7.97 | 3.8611 | 0.120 |
| 125 | 1.54E+05 | 0.3 | 16.86 | 7.97 | 3.9722 | 0.122 |
| 150 | 1.54E+05 | 0.3 | 17.22 | 7.97 | 4.0556 | 0.123 |
| 175 | 1.54E+05 | 0.3 | 17.55 | 7.97 | 4.1667 | 0.125 |
| 200 | 1.54E+05 | 0.3 | 17.85 | 7.97 | 4.2778 | 0.127 |
| 225 | 1.54E+05 | 0.3 | 18.12 | 7.97 | 4.3611 | 0.127 |
| 250 | 1.54E+05 | 0.3 | 18.36 | 7.97 | 4.4722 | 0.128 |
| 275 | 1.54E+05 | 0.3 | 18.58 | 7.97 | 4.5556 | 0.129 |

TABLE 1-continued

| Temperature (° C.) | Coefficient of Young's (N/mm2) | Poisson's Ratio | Transient Thermal Expansion C efficient (10E–6 mm/mm/° C.) | Density (xE+3 kg/m3) | Heat Transfer Coefficient (xE–6 kcal/mm s ° C.) | Specific Heat (kcal/kg? ° C.) |
|---|---|---|---|---|---|---|
| 300 | 1.54E+05 | 0.3 | 18.79 | 7.97 | 4.6111 | 0.130 |
| 325 | 1.54E+05 | 0.3 | 18.99 | 7.97 | 4.7222 | 0.130 |
| 350 | 1.54E+05 | 0.3 | 19.19 | 7.97 | 4.8056 | 0.132 |
| 375 | 1.54E+05 | 0.3 | 19.39 | 7.97 | 4.8888 | 0.133 |
| 400 | 1.54E+05 | 0.3 | 19.57 | 7.97 | 4.9722 | 0.133 |
| 425 | 1.54E+05 | 0.3 | 19.75 | 7.97 | 5.0278 | 0.133 |
| 450 | 1.54E+05 | 0.3 | 19.93 | 7.97 | 5.1389 | 0.134 |
| 475 | 1.54E+05 | 0.3 | 20.11 | 7.97 | 5.2222 | 0.136 |
| 500 | 1.54E+05 | 0.3 | 20.28 | 7.97 | 5.3056 | 0.136 |
| 525 | 1.54E+05 | 0.3 | 20.45 | 7.97 | 5.3889 | 0.137 |
| 550 | 1.54E+05 | 0.3 | 20.80 | 7.97 | 5.5000 | 0.137 |
| 575 | 1.54E+05 | 0.3 | 20.74 | 7.97 | 5.5556 | 0.138 |
| 600 | 1.54E+05 | 0.3 | 20.87 | 7.97 | 5.6389 | 0.138 |

In addition, Table 2 shows physical values of a heat conductive plate made of graphite, and Table 3 shows the same but made of 12% Cr steel, respectively.

TABLE 2

| Density (xE+3 kg/m**3) | Specific Heat (kcal/kg?° C.) | Heat Transfer Coefficient (kcal/mm s ° C.) |
|---|---|---|
| 2.25 | 0.165 | 0.0033+00 |

TABLE 3

| Temperature (° C.) | Density (xE+3 kg/m**3) | Specific Heat (kcal/kg ° C.) | Heat Transfer Coefficient (kcal/mm s ° C.) |
|---|---|---|---|
| 0 | 7.860 | 0.1061 | 5.422E–06 |
| 400 | 7.860 | 0.1746 | 7.452E–06 |
| 450 | 7.860 | 0.1873 | 7.643E–06 |
| 500 | 7.860 | 0.1999 | 7.810E–06 |
| 550 | 7.860 | 0.2174 | 8.049E–06 |
| 600 | 7.860 | 0.2348 | 8.264E–06 |
| 650 | 7.860 | 0.2695 | 8.192E–06 |
| 700 | 7.860 | 0.3039 | 8.096E–06 |

The emission rates also, were assumed in conservative figures, 0.1 for the case of reactor wall made of stainless steel and 12% Cr Steel, and 0.8 for the case of graphite, were adopted respectively as shown in Table 4.

TABLE 4

| | View Factor | Emission Rate | Stephan-Boltzmann Constant (kcal/m2hrk4) |
|---|---|---|---|
| Reactor Wall (Stainless Steel) | 1.0 | 0.1 | 4.88E–08 |
| Heat Conductive Plate (Graphite) | | 0.8 | |
| Heat Conductive Plate (12% Cr Steel) | | 0.1 | |

Simulating the thermal load taking place at the start of the reactor, the analysis was carried out with the internal sodium temperature raised from 200° C. up to 600° C. The heating up speed was at a rate of 15° C./hr from 200° C. up to 400° C., and 20° C./hr from 400° C. up to 600° C. The rise in liquid level to the temperature rise of sodium, had also been taken into consideration. The rise in liquid sodium as against the rise in temperature were assumed for 880 mm for the temperature range from 200° C. up to 400° C., and thereafter for 350 mm from 400° C. up to 600° C., respectively. For developing an analytic model, a mesh generation program for finite element analysis Femap v7.1 and for analytic tool, a general purpose nonlinear structural analysis system FINAS v14 had been utilized.

Figure 4:
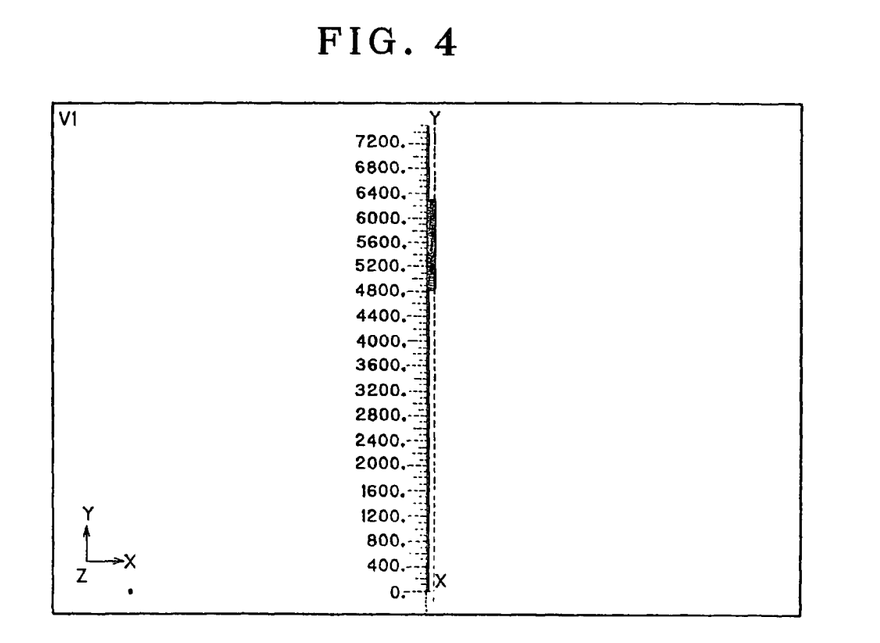
FIG. 4 is a drawing to show an analysis mesh model.
Figure 5:
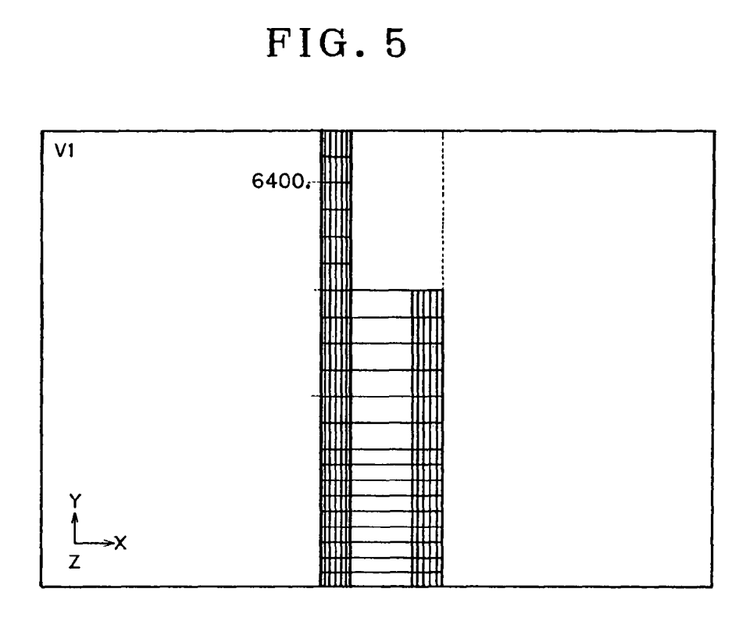
FIG. 5 is a drawing to show an analysis mesh model zoomed in at the part of heat conductive plate.

FIG. 4 shows the analysis mesh model made out of FIG. 1, and FIG. 5 shows the same zoomed in on the heat conductive plate, respectively. In addition, the Table 5 shows the list of elements used for the analysis.

TABLE 5

| | Elements used for developing finite element model |
|---|---|
| Heat Transfer Analysis | Heat conductive 8 node tetragon axisymmetric element (HQAX8) |
| | Heat conductive 3 node axisymmetric element (FCAX3) |
| | Radiation link 6 node tetragon axisymmetric element (RALINK6) |
| Stress Analysis | 8 node tetragon axisymmetric element (QAX8) |

Elements used for developing finite element model
Heat Transfer Analysis
Heat conductive 8 node tetragon axisymmetric element (HQAX8)
Heat conductive 3 node axisymmetric element (FCAX3)
Radiation link 6 node tetragon axisymmetric element (RALINK6)
Stress Analysis
8 node tetragon axisymmetric element (QAX8)

Figure 6:
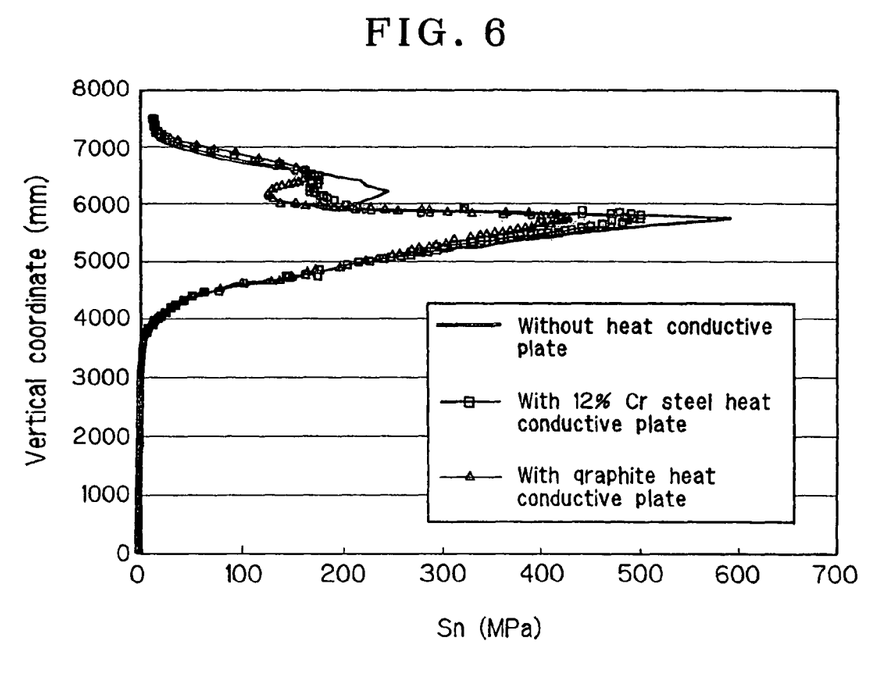
FIG. 6 is a drawing to show the difference in generated stresses obtained as the result of the analysis between the cases with or without heat conductive plate.

FIG. 6 is a drawing to show the difference in generated stresses obtained as the result of the analysis among the 3 patterns of analysis; a case without thermal stress reduction by means of a heat conductive plate, a case with graphite heat conductive plate and a case with a 12% Cr steel heat conductive plate. On the drawing horizontal axis indicates generated stress Sn (MPa) and vertical axis indicates vertical coordinate (mm).

As for the analysis result, the stress intensity range (Sn) on the reactor outer wall, being utilized as the strength designing parameter, had been calculated and indicated. The calculation result proves that Sn varies to the difference between emission rate and heat transfer coefficient of the heat conductive plate. The result of an analysis using graphite which is good in emission, as heat conductive plate, showed the maximum value of Sn reduced from approx 590 MPa to approx 430 MPa, or by about 27%. Also, the result using 12% Cr steel as heat conductive plate, the maximum value of Sn was confirmed to have reduced to approx 500 MPa or by about 15%. This verified that a simple installation using a heat conductive plate, significantly reduced the thermal stress taking place on the reactor wall.

Next, an example is explained whereby a reactor vessel thermal stress is reduced by using different material only, without adding any members anew.

Figure 7:
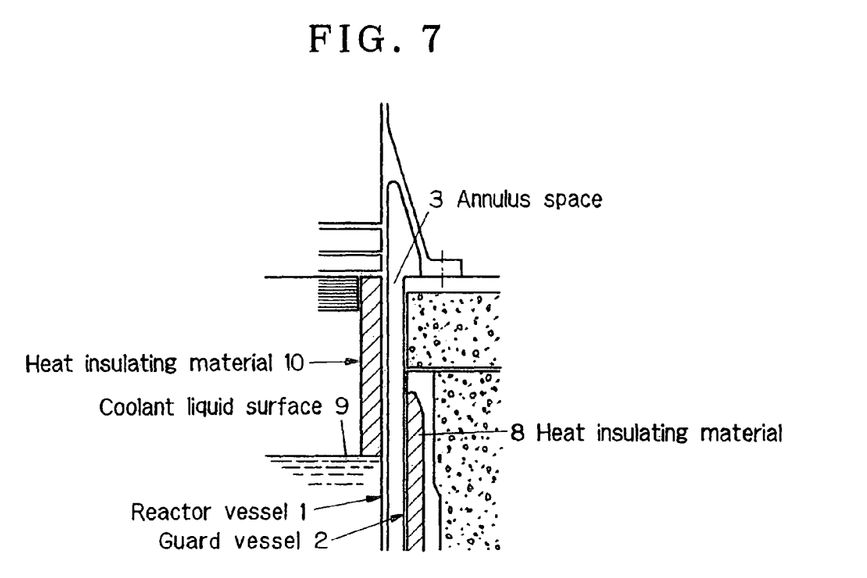
FIG. 7 is a drawing to show another embodiment example of the thermal load reducing system for reduction of stress near the liquid surface of the reactor vessel.

FIG. 7 shows another embodiment example of the thermal load reducing system for reduction of stress near the liquid level of a reactor vessel.

Ordinarily, guard vessel is made of the same material with the reactor vessel. In this embodiment, however, the material of the guard vessel 2 being altered to better material in heat conduction coefficient than that of the reactor vessel. This embodiment is characterized in that the guard vessel 2 become a heat conductive member, and the guard vessel thermally combined by radiation with the reactor wall, expediting the thermal conduction in the vertical direction to the reactor vessel wall, reduces the thermal stress near the liquid level. The composition of the reactor vessel is identical to that of FIG. 1 except that there is no heat conductive plate.

Figure 8:
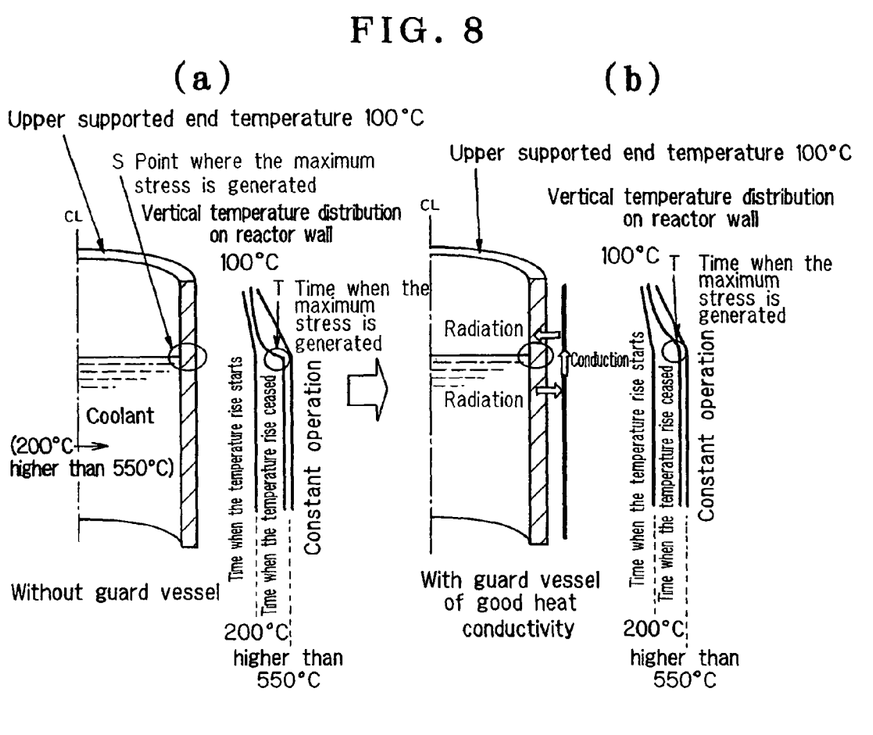
FIG. 8 is a drawing to explain the principle of thermal load reduction near the coolant liquid surface of the reactor vessel.

FIG. 8 is a drawing to explain the principle of thermal load reduction near the coolant liquid surface of a reactor vessel; FIG. 8 (*a*) for the case without a guard vessel and FIG. 8 (*b*) for the case with guard vessel of good heat conductive material.

Like what has been explained over FIG. 2, during the starting operation, contained coolant temperature rises from 200° C. to 550° C., a local temperature gradient in the vertical direction developing during this process, causes a high thermal stress on the reactor wall (FIG. 8 (*a*)). Between the part contacting high temperature coolant and the part contacting low temperature gas, there appears a steep temperature gradient i.e. a bending edge of the temperature curve, at the time when the temperature rise ceased. Accordingly, the highest stress is generated on the outer surface of the reactor wall (the point S in FIG. 8 (*a*)) near the liquid surface at the time when temperature rise ceased. To moderate this problem, as shown in FIG. 8 (*b*), the guard vessel of good heat conductive material is heated up with the heat radiation from the high temperature reactor wall below the liquid surface, and in turn, the low temperature reactor wall above liquid surface is heated up with the heat radiation the from the guard vessel of good heat conductive material. This makes it possible to reduce the temperature gradient in the vertical direction, which causes the stress. As the result, the temperature gradient at point S where the maximum stress taking place, is smoothed at the time T when the maximum stress being generated, and the thermal load is reduced. This embodiment is characterized in that the method not only avoids any effect to the construction cost with no new members being added, but also assures operation due to its non-contacting and static structure.

Figure 9:
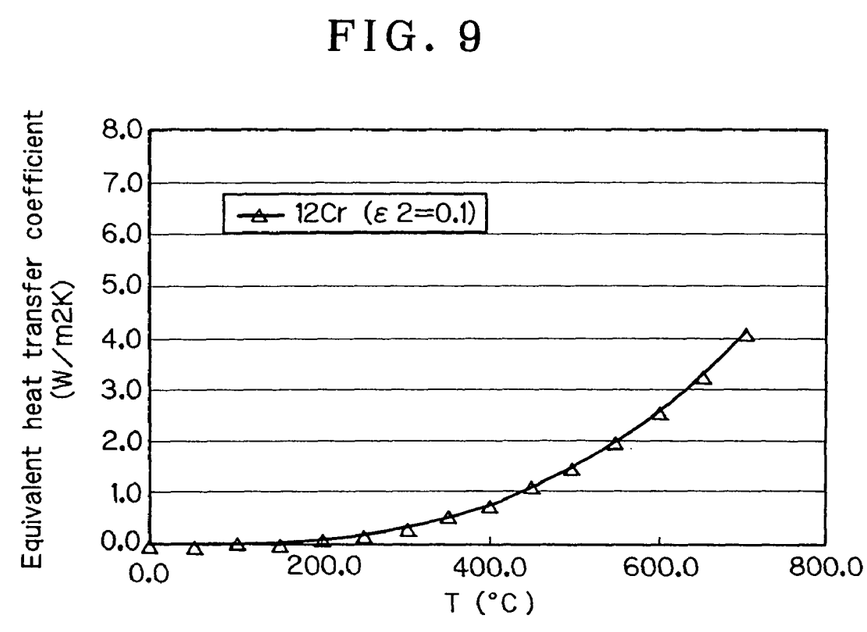
FIG. 9 is a drawing to show the relationship between equivalent heat transfer coefficient due to radiation and temperature in use.

FIG. 9 is a drawing to show the relationship between equivalent heat transfer coefficient due to radiation and temperature in use, horizontal axis indicates temperature (T) of reactor wall and guard vessel (of high chrome steel such as 12% Cr steel), while vertical axis indicates equivalent heat transfer coefficient (heq).

In this embodiment, assuming a conservative value of emission rate between reactor wall and guard vessel of 12% Cr steel, and assigning $\epsilon 1 = 0.1$ and $\epsilon 2 = 0.1$, the relation between equivalent heat transfer coefficient heq and T(° C.)=T1=T2 (thermally equal condition) was calculated. As the temperature of the reactor wall and of the guard vessel (of high chrome steel such as 12% Cr steel) going up, heat transfer coefficient sharply increases. And at around 600° C., the radiation heating seems to perform a good heat transfer by way of the guard vessel.

For the reactor structure of simple 316FR stainless steel reactor vessel without a special measure for thermal stress reduction and a guard vessel, difference in maximum stresses generated during the temperature rise up to 600° C. at the start of reactor operation was calculated and compared through numerical experiment, in cases without considering the radiation heating by guard vessel, with a guard vessel of 316FR stainless steel same with the reactor vessel, and with a guard vessel of 12% Cr steel, a good heat conductive material.

Physical values of reactor wall used for the analysis are those shown in Table 1, and those of the good heat conductive material used for the guard vessel are those shown in Table 2 (12% Cr Steel). As to the emission rate liable to uncertainty, for $\epsilon 1$ and $\epsilon 2$, 0.1 and 0.1 were assigned respectively, to estimate the effect of thermal stress reduction modestly. For load condition, development of analytic models and analytic tool are identical to the case of heat conductive plate.

Figure 10:
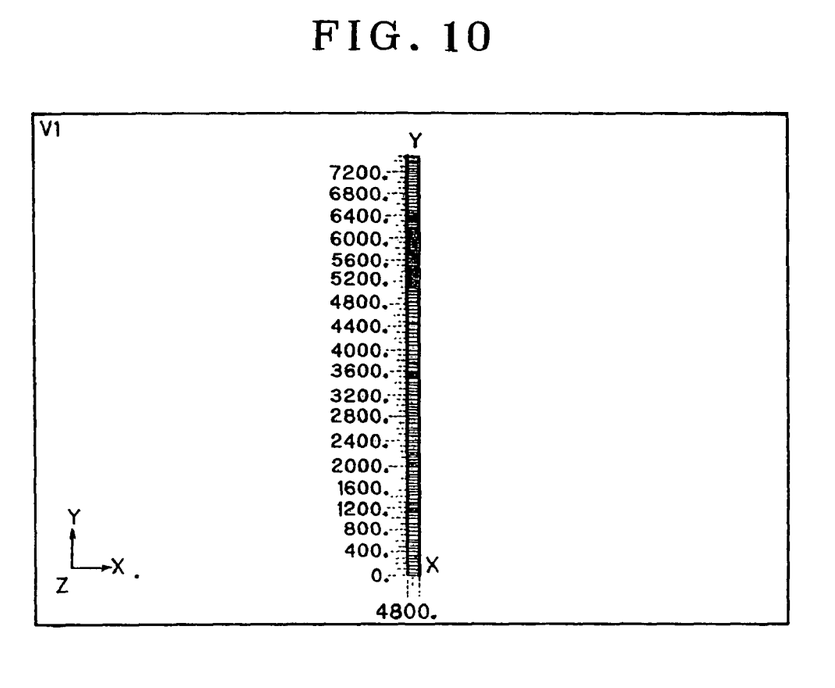
FIG. 10 is a drawing to show an analysis mesh model.
Figure 11:
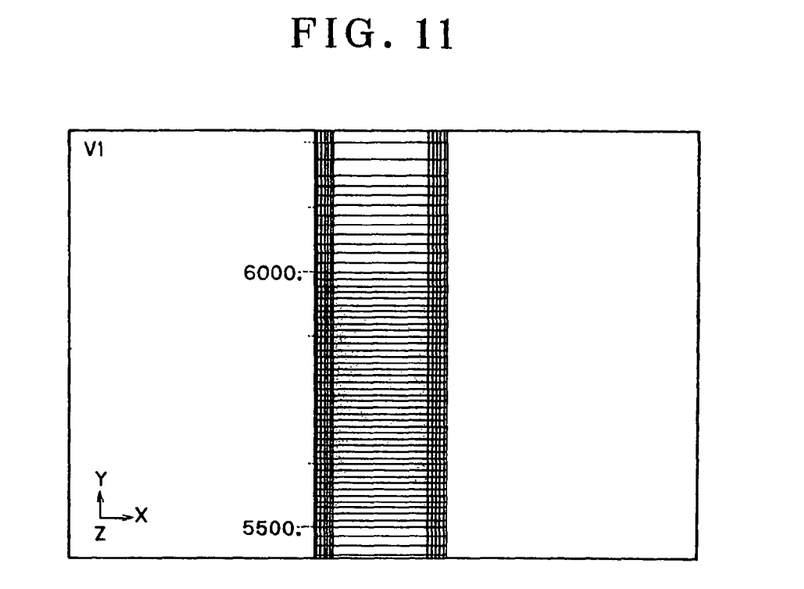
FIG. 11 is a drawing to show an analysis mesh model zoomed in at the part near the liquid surface.

FIG. 10 shows an analysis mesh model made out of FIG. 7, and FIG. 11 shows an analysis mesh model zoomed-in at the liquid surface part.

Figure 12:
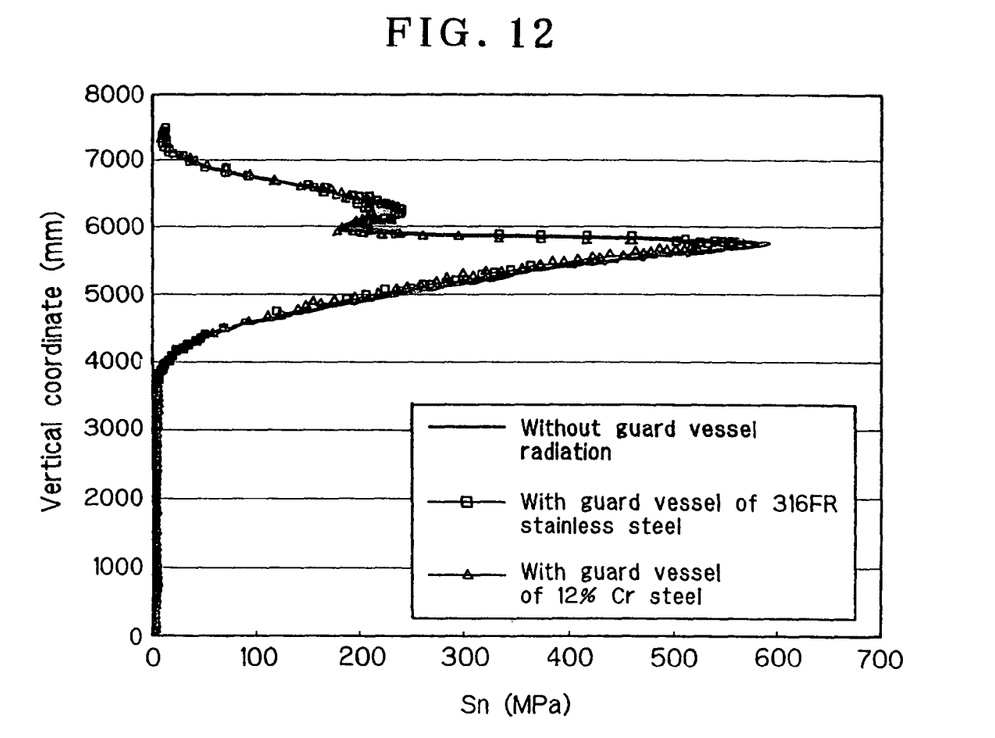
FIG. 12 is a drawing to show the difference in generated stresses obtained as the result of the analysis.

FIG. 12 (corresponding to FIG. 6) is a drawing to show the difference in generated stresses obtained as the result of the analysis. Horizontal axis indicates generated stress Sn (MPa) and vertical axis indicates vertical coordinate (mm), showing the analysis results in 3 patterns of without considering the radiation heating by guard vessel, with a guard vessel of 12% Cr Steel, and with a guard vessel of 316FR stainless steel. The analysis results were indicated, in accordance with vertical distribution of the stress intensity area (Sn) along the reactor outer wall, which is utilized as the strength evaluation parameter in respective design. The case of using 12% Cr steel for guard vessel, compared with the case not considering the radiation heating by way of the guard vessel, the maximum value of Sn is reduced from approx 590 MPa to approx 519 MPa, or by about 12%. Also, the analysis result using 316FR stainless steel as guard vessel, the maximum value of Sn was confirmed to have reduced to approx 562 MPa or by about 4.7%. This verified that a change in guard vessel material from ordinary one to good heat conductive one, achieves a distinguished thermal load reduction.

As detailed above applying the present invention, thermal load near the coolant liquid level can be reduced by placing a heat conductive member, outside the reactor vessel in the area above and below the coolant surface without contacting to the reactor vessel wall.

Particularly, in case placing a heat conductive plate as a heat conductive member, only by an addition of a simple heat conductive plate, thermal load near the coolant surface can be reduced, not only at a low cost but also assuring the operation since it is a non-contacting and static structure. Equally, in case using guard vessel as heat conductive member, thermal load near the coolant surface can be reduced, without adding any member anew, not affecting the construction cost and assuring the operation since it is a non-contacting and static structure.

We claim:

1. A reactor vessel thermal load reducing system comprising:
  a reactor vessel having a reactor vessel wall and being partially filled with liquid coolant to an operating coolant liquid surface level between a bottom and a top of said reactor vessel wall, wherein said reactor vessel wall has the following vertically defined points:

Point A at said bottom of the wall,
Point C at said operating coolant liquid surface level,
Point E at said top of the wall,
Point B between Point A and Point C, and
Point D between Point C and Point E;
a guard vessel located circumferentially outside and adjacent to said reactor vessel; and
a reactor vessel wall temperature difference minimizing means, said means comprising
a heat conductive member circumferentially located directly adjacent to said reactor vessel wall;
solid heat insulation material distributed on the inside of said reactor vessel wall from point D to point C but not from point B to point A;
solid heat insulation material distributed on the outside of said guard vessel from a point horizontally adjacent to point B to a point horizontally adjacent to point D;
wherein during steady state operation of said reactor, said heat conductive member receives a net amount of heat radiation from said reactor vessel wall from point B to point C, and said heat conductive member radiates a net amount of heat to said reactor vessel wall from point C to point D;
wherein said heat conductive member is a member attached to said guard vessel wall; and
wherein said heat conductive member has a higher heat conduction coefficient than said reactor vessel wall; and
wherein said heat conductive member reduces the thermal stress on said reactor vessel wall that would otherwise be caused by the rapid increase of the liquid coolant temperature being raised during reactor startup from 200° C. to 550° C.

2. The reactor vessel thermal load reducing system according to claim 1, wherein said heat conductive member is 12% Cr steel.

* * * * *